May 15, 1934.　　　O. CHRISTOFFERSEN　　　1,958,911
STRAP FASTENER
Filed April 13, 1933
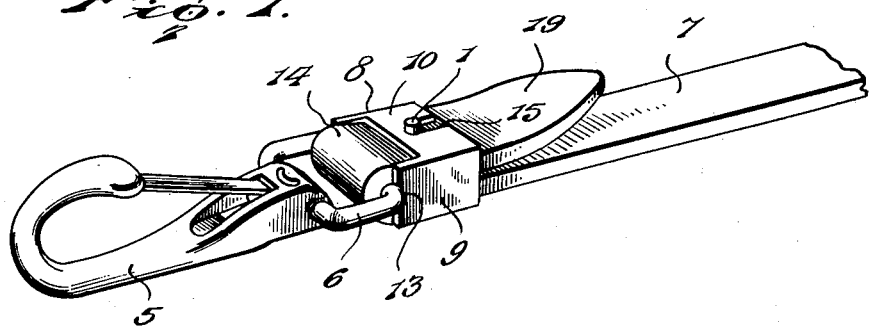
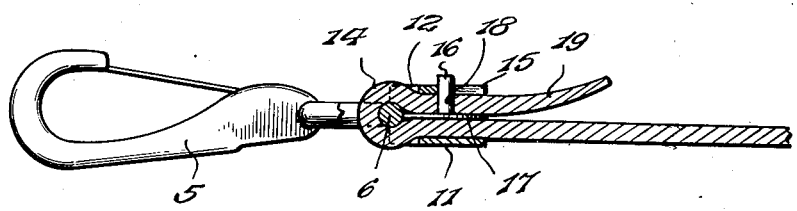
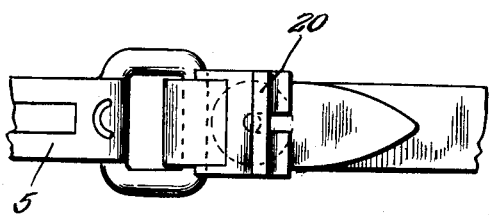
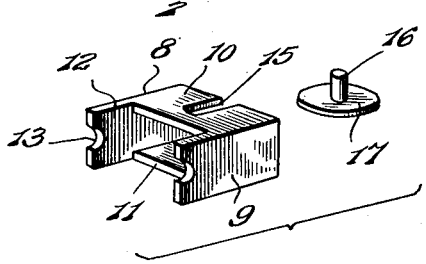
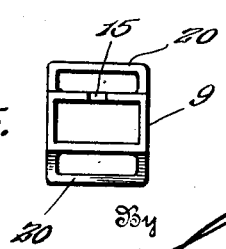
Inventor
Otto Christoffersen.
By Lacey & Lacey,
Attorneys Patented May 15, 1934

1,958,911

UNITED STATES PATENT OFFICE 1,958,911

STRAP FASTENER

Otto Christoffersen, Herman, Nebr.

Application April 13, 1933, Serial No. 666,014

7 Claims. (Cl. 24—265)

This invention relates to strap fasteners and has for its object to provide a comparatively simple and thoroughly efficient device of this character by means of which snap fasteners, buckles, retaining rings, and similar harness equipment may be conveniently and firmly attached to a checkrein or other portion of a harness without the employment of rivets or similar fastening devices and without the necessity of puncturing or otherwise mutilating the strap to which the snap or buckle is to be secured.

A further object of the invention is to provide a strap fastener including a hollow body portion through which the strap extends for connection with a snap or buckle, there being a slot formed in one end of the hollow body and coacting with a locking pin interposed between the folds of the strap whereby, when a longitudinal pull is exerted on one end of the strap, the pin will enter said slot and securely hold the fastener in position and effectually prevent accidental displacement of the snap or buckle.

A further object is to provide a strap fastener, the construction of which is such that a longitudinal pull on one end of the strap will cause locking engagement between the pin and slot and a longitudinal pull on the other end of the strap will release the locking pin and permit removal of the snap.

A still further object of the invention is generally to improve this class of devices so as to increase their utility, durability, and efficiency.

Similar numerals of reference indicate corresponding parts in all the figures of the drawing.

Figure 1 is a perspective view of a strap fastener constructed in accordance with the present invention.

Figure 2 is a longitudinal sectional view, partly in side elevation.

Figure 3 is a perspective view of the fastener and locking pin detached, and

Figure 4 is a plan view illustrating a modified form of the invention.

Figure 5 is an end elevation of the fastener shown in Fig. 4 with the strap removed.

The improved fastener forming the subject matter of the present invention is principally designed for detachably securing snap fasteners, buckles and similar devices on the checkreins or other parts of a harness and by way of illustration is shown applied to a portion of the harness in which 5 designates a snap fastener of conventional construction having a terminal link or loop 6 for connection with a checkrein indicated at 7. The fastener comprises a hollow body portion 8, preferably formed of metal and substantially rectangular in shape, as shown, the side walls 9 of said body portion being extended longitudinally beyond the upper and lower walls 10 and 11 thereof to form spaced side wings 12 having bearing recesses or notches 13 formed therein and adapted to receive the adjacent cross bar of the link 6 of the snap faster whereby to permit free pivotal movement of the snap fastener with respect to the body portion. One end of the checkrein or strap 7 is extended through the hollow body portion 8 in contact with the lower wall 11 thereof and thence extends around the adjacent cross bar of the link 6 to form an attaching loop 14, the strap being folded upon itself and extended within and beyond the body portion and in contact with the lower surface of the upper wall 10 of said body portion. The upper wall 10 of the body portion is provided with a longitudinally disposed slot 15 which opens through the rear end of the body portion and is adapted to receive a locking pin 16. The locking pin 16 is provided with a relatively large and substantially circular base portion 17 which is interposed between the upper and lower strands of the strap 7, said base 17 not only serving to prevent lateral tilting of the pin 16 but also acting as a wedge to force the strands of the strap into engagement with the upper and lower walls of the body portion when the pin is moved to locking position within the slot 15.

In order to attach the snap 5 to the checkrein 7 one end of the strap is passed through the body portion and around the adjacent cross bar of the link 6 and thence rearwardly through the body portion. The pin 16 of the locking device is then inserted through an opening 18 in the short end of the strap and a longitudinal pull exerted on the long end of the strap which causes the pin 16 to enter the slot 15 and the head of the locking device to exert a wedging action between the strands of said strap at the fold thereof thereby securely and detachably securing the snap to the checkrein. In order to remove the snap 5 from the checkrein it is merely necessary to exert a longitudinal pull on the short end 19 of the checkrein or strap which disengages the locking pin from the slot 15 and at the same time relieves the wedging action exerted by the head 17 on the adjacent faces of the strap, thus permitting the long end of the strap to be readily removed from the body portion and the snap 5 detached therefrom should the latter become worn or for any reason need replacing. It will be noted that owing to the construction of the fastener it is not necessary to puncture or otherwise mutilate the checkrein or strap in order to attach or detach the snap fastener, as is the case with buckles and similar fastening devices at present employed for this purpose. The device is very simple in construction, positive in operation, and may be manufactured and placed on the market at a comparatively small cost.

In Figures 4 and 5 of the drawing there is illustrated a modified form of the invention in which the upper and lower walls of the hollow body portion are provided with oppositely disposed loops 20 adapted to receive a hame strap, buckle, or other portion of a harness, the construction and operation of the device being otherwise similar to that shown in Figure 1 of the drawing. It will, of course, be understood that the body portion of the fastener may be made with either one or more laterally extending loops 20, according to the work to be performed, and when the fastener is used for securing spring snaps to checkreins and the like it is preferred to entirely dispense with said loops.

Having thus described the invention, what is claimed is:

1. A strap fastener comprising a hollow body having a longitudinal slot therein opening through the top and one end of said body, a strap adapted to engage a fastening device and having a protion thereof folded upon itself within the body, and a locking pin interposed between the strands of the strap at the fold thereof and movable into the longitudinal slot from the open end thereof.

2. A strap fastener comprising a hollow body having a longitudinal slot formed therein and opening through the top and one end thereof, a strap adapted to engage a fastening device and having a portion thereof folded upon itself within the body, and a locking device interposed between the strands of the strap at the fold thereof and provided with an upstanding pin movable into engagement with said slot through the open end thereof.

3. A strap fastener comprising a hollow body substantially rectangular in cross section and having its upper portion provided with a longitudinal slot opening through the top and one end thereof, a strap adapted to engage a fastening device and having a portion thereof folded upon itself within the body, and a locking pin having an enlarged head interposed between the strands of the strap at the fold thereof, said pin being adapted to enter the slot and engage the top of the hollow body when a longitudinal pull is exerted on one end of said strap.

4. The combination with a fastening device including a supporting link, of a hollow body portion having a longitudinal slot therein and provided with recesses forming bearings for the supporting link, a strap threaded through the body portion and folded around the link to hold said link in the bearing recesses and thence extended rearwardly through said body portion, and a locking pin having an enlarged head interposed between the strands of the strap at the fold thereof, said pin being movable into engagement with the slot when a longitudinal pull is exerted on one end of the strap and movable out of engagement with the slot when a longitudinal pull is exerted on another end of said strap.

5. The combination with a fastening device including a supporting link, of a hollow body portion having its side walls extended beyond its top wall and provided with terminal recesses forming bearings for the supporting link, there being a longitudinal slot formed in the top of the body portion and opening through the rear end thereof, a strap threaded through the body portion and folded around the supporting link for holding said link in the bearing recesses, the end of the strap being thence extended rearwardly through and beyond the body portion to form a short terminal, and a locking pin interposed between the strands of the strap at the fold thereof and movable into engagement with the slot when a longitudinal pull is exerted on the long end of the strap and movable out of engagement with the slot when a longitudinal pull is exerted on the short terminal of the strap.

6. A strap fastener comprising a hollow body portion substantially rectangular in cross section and having its upper and lower walls cut away to form side extensions having terminal bearing recesses formed therein, there being a longitudinal slot formed in the upper wall of the body portion and opening through the end thereof, a strap threaded through the body portion and adapted to extend around the connecting link of a fastening device for normally seating said connecting link in the bearing recesses, said strap being extended longitudinally within and beyond the body portion in superposed relation to the first-mentioned portion of the strap, and a locking device having an enlarged head interposed between the strands of the strap adjacent the slot and provided with an upstanding pin extending through an opening in the strap and entering the slot in the body portion for clamping the fastener in position on said strap.

7. A strap fastener comprising a hollow body having a longitudinal slot therein and provided with recesses forming bearings for a supporting link, a strap extending around the supporting link for holding the link in the bearing recesses and having a portion thereof folded upon itself within the hollow body, and a locking pin interposed between the strands of the strap at the fold thereof, said pin being movable into engagement with the slot when a longitudinal pull is exerted on one end of the strap and movable to released position out of engagement with the slot when a longitudinal pull is exerted on another end of the strap.

OTTO CHRISTOFFERSEN. [L. S.]